United States Patent
Kratschmar et al.

[15] 3,645,477
[45] Feb. 29, 1972

[54] SWING-WING AIRCRAFT

[72] Inventors: Herwig Kratschmar; Gero Otto Madelung, both of Munich, Germany

[73] Assignee: Messerschmitt-Bolkow-Blohm, Munich, Germany

[22] Filed: Dec. 18, 1969

[21] Appl. No.: 886,088

[30] Foreign Application Priority Data

Dec. 20, 1968 Germany .................... P 18 16 065.1

[52] U.S. Cl. ................................................. 244/46
[51] Int. Cl. ................................................. B64c 3/40
[58] Field of Search ..................... 244/46, 48, 49, 130

[56] References Cited

UNITED STATES PATENTS 3,481,562  12/1969  Deplante ........................... 244/46

Primary Examiner—Trygve M. Blix
Assistant Examiner—Carl A. Rutledge
Attorney—John J. Byrne

[57] ABSTRACT

A gap filler for swing-wing aircraft including means for adjustably inserting a plugging member into the gap formed between the movable wing and its fixed support in its movement from one extreme position to the other. Means are provided for coordinating the movement of the gap plugging member with the movement of the movable wing to provide a substantially continuous, smooth leading edge for aerodynamic efficiency.

7 Claims, 5 Drawing Figures

Patented Feb. 29, 1972  3,645,477

SWING-WING AIRCRAFT

This invention relates to swing-wing aircraft and more specifically to swing-wing aircraft having means to plug gaps opening between the movable wings and their fixed supports during movement of the wings from one extreme position to the other.

In an aircraft whose wings are pivotally mounted to the aircraft fuselage or to other wing parts, the connection points of the pivotable wings or pivotable wing parts must be so constructed that so far as possible and during all stages of the pivotal motion of the wings, no gaps will appear between the movable wing and the support or other wing part to which it is pivotally connected. Generally, gaps occur in the leading edge of a swing-wing at its juncture with its support during movement of the wing or wing portion between its extreme positions; namely, the fully extended position and the maximum swept-back position. In the extreme positions, in most cases, no gaps exist, in that portions of the movable wing and its support are in contact. The problems occur between the extreme positions where a gap occurs and the size thereof varies during movement of the wing from one position to another. The presence of a gap at any point in the skin of the aircraft wing could result in undesirable consequences under flight conditions, not only with regard to air resistance or aerodynamic efficiency, but also, with regard to the safety of the aircraft.

It is known in the prior art to provide means for covering gaps in swing-wing aircraft. German Pat. No. 1,175,997 discloses a swing-wing aircraft wherein the pivotable wing part comprises a circular protuberant portion in the leading edge, so that a gap is prevented from being formed in this region while the aircraft wings are being folded or swung back. In the outwardly pivoted or fully extended position of the wing this protuberant portion lies within the fixed support for the wing. However, when the wing is in its full sweptback position adjacent the aircraft fuselage, which is the case when the aircraft is prepared for high speeds, the protuberant portions project into the air stream and cause aerodynamic drag. In U.S. Pat. No. 3,270,989, appendages are provided on each side of the aircraft fuselage and close any gaps occurring between the movable wing and its fixed support when the wing is in either of its two extreme positions of its range of pivotal or swinging movement. In the intermediate positions, gaps occur; however, this prior proposal has the advantages relative to the above referred to German patent in that a smooth or continuous aerodynamically efficient wing surface is present in the more important wing position; namely, the inwardly pivoted or folded wing position.

It is an object of this invention to eliminate the above-described disadvantages of the prior art by providing means to close or cover the gap occurring between the movable wing and its fixed support in all positions of the movable wing relative to its support.

It is a further object of this invention to not only fill or close the gap referred to above but to do so in a manner that the outer surfaces of the wing and its support will be substantially smooth and unbroken at their juncture. The gap, which varies in size over the movement range of the wing, is continuously covered or filled while the wings are swinging toward or away from the fuselage.

These objects are substantially realized, according to the invention by arranging for the gap to be covered over by means which emerge from the wings or their support and which return when the wings are in the two extreme positions in which there are no gaps present. In the most important wing position, the position in which the wings are fully inwardly folded for high speed conditions there are no aerodynamic obstructions or protuberances on the wing surface. According to one embodiment of the invention, the gaps are covered or filled by inflatable wing segments positioned in the areas where the gaps would otherwise appear. These inflatable wing surfaces cover over or fill the gaps and are so shaped as to insure the aerodynamic integrity of the aircraft by providing a substantially continuous surface. In other embodiments, mechanical structures, such as shaped parts, profiled parts or coverlike parts are provided which are movably disposed within a wing part and which, when a gap opens, move into the gap so as to cover it or fill it as the case may be. The movable parts are aerodynamically mated to the adjacent aircraft segments. Various actuating means such as hydraulic cylinders, cam discs or other mechanical devices are used for actuating the plugging members in correlation with the movement of the swing-wings.

These and other objects of the invention will become more apparent to those skilled in the art by reference to the following detailed description when viewed in light of the accompanying drawings wherein.

Figure 1:
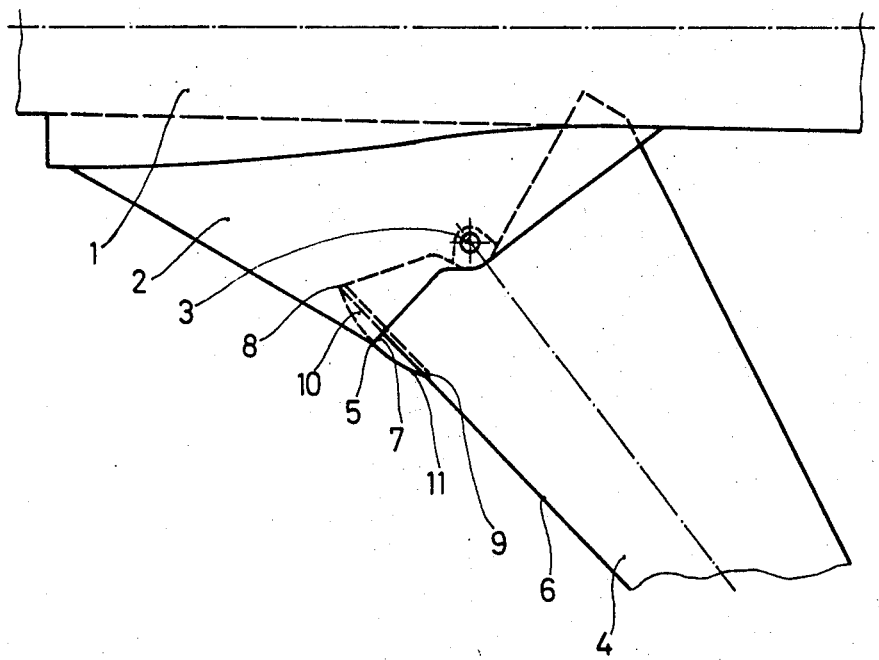
FIG. 1 is a plan view of the aircraft wing structure of this invention.

In accordance with the embodiment of the invention illustrated in FIG. 1, a stationary wing part 2 is fixed to the aircraft fuselage 1. A movable wing part 4 is pivotally connected to the stationary wing part 2 by means of a pin 3 and is pivotal about a vertical axis. The wing part 4 is shown in between its two extreme positions, the central position in which a gap 7 is formed between the front or leading edge of the fixed wing part or support 2 and the leading, longitudinal edge 6 of the movable wing part 4. A respective one of the two points 8 and 9 comes into alignment and contact with the resilient portion of edge 5 in the two extreme positions of the movable wing, in which no gap is present and a continuous, smooth leading edge is presented. In order to prevent a gap 7 occurring while the movable wing part 4 is being pivoted or folded, the longitudinal edge 6 is constructed so as to be inflatable in the region between the points 8 and 9 to define an inflated wing segment 10 whose curvilinear leading edge 11 preferably has a radius whose fixed point is coincidental with the axis of the swivel pin 3. In this arrangement of the portion 10 and the resilient surface 5, the leading edge 11 of the latter directly moves along the portion 5 of the stationary wing part 2, so that the gap 7 is filled in each position within the range of pivoting or swinging motion of the movable wing part 4. The wing segment 10 only needs to be inflated while the pivotal motion of the movable wing part is taking place. The size of the gap varies during wing movement. The means for inflating the portion 10 are correlated to movement of the wing 4.

Figure 2:
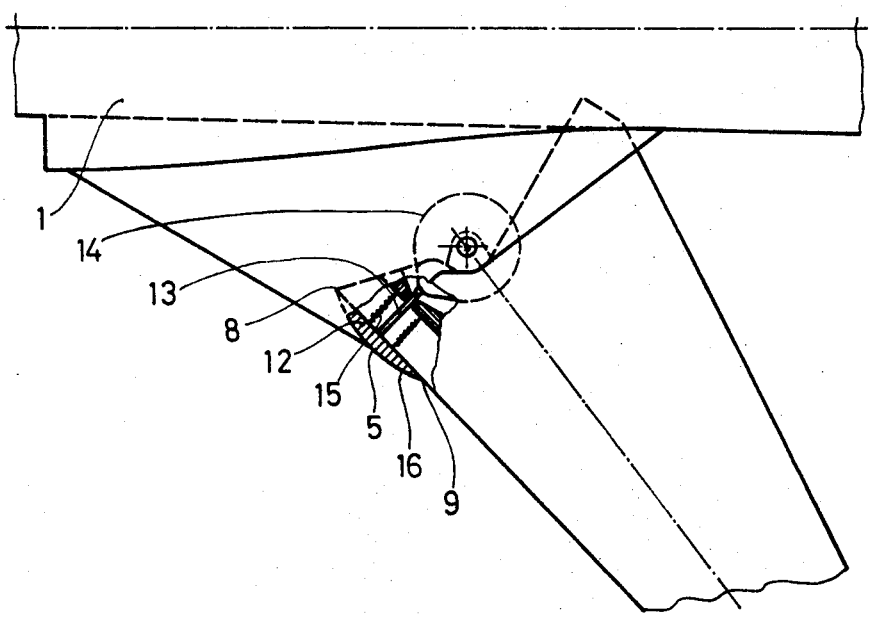
FIG. 2 is a plan view of another embodiment of the aircraft wing structure of this invention.

In the embodiment of FIG. 2, the gap is filled by arcuate-shaped element 12 which is pressed outwardly from the wing and against resilient portion 5 of the wing leading edge. The element 12 is spring-urged to its inward position by springs 15. The outward movement of the element 12 is correlated to the movement of the wing part 4 and takes place through the intermediary of a control device which consists of a push rod or plunger 13 which is connected to the inner side of the element 12 and rides on cam disc 14 which is fixed for rotary movement with the wing 4. The surfaces 11 and 16 of the construction of FIGS. 1 and 2 are curvilinear and, therefore, will always be capable of covering over or filling the gap 7 in any angular position of the wing part 4.

Figure 3:
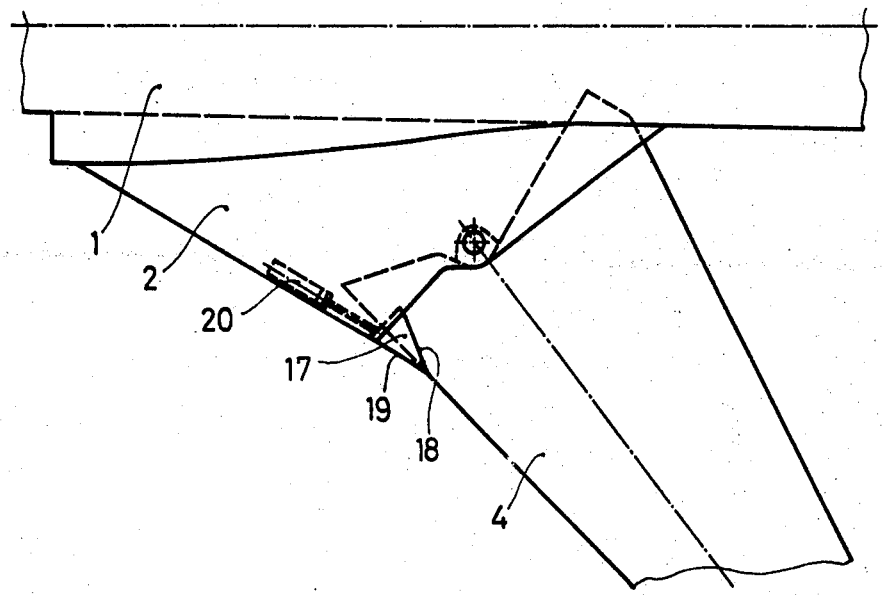
FIG. 3 is a plan view of another embodiment of the aircraft wing structure of this invention.
Figure 4:
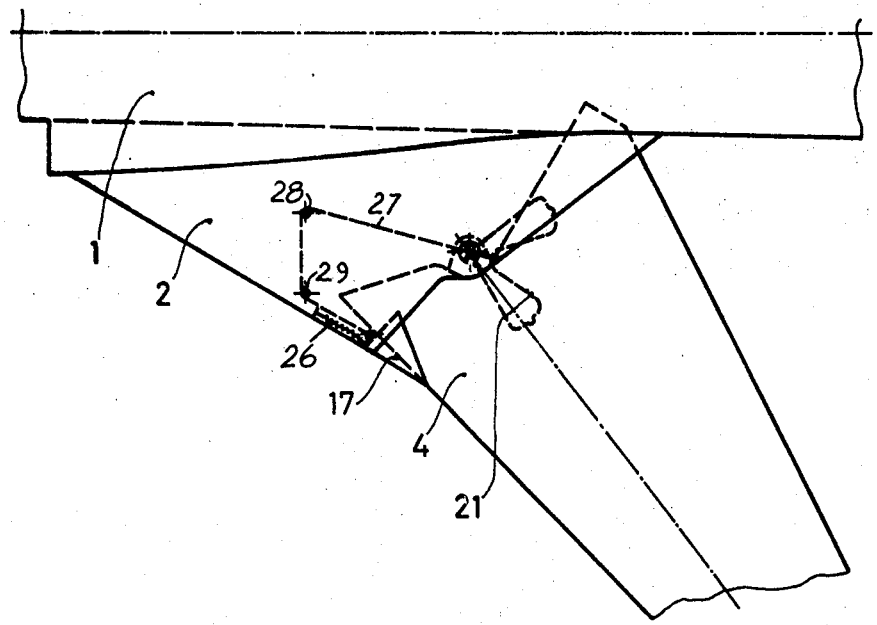
FIG. 4 is a plan view of a modified form of the aircraft wing structure of FIG. 3.

Another embodiment is shown in FIGS. 3 and 4. A hoodlike sliding element 17 generally resembling a wedge can be thrust into the gap 7 from the inside of the wing part 4. The element 17 fits over the leading edge of the wing 4 in mating relationship and is slidable therein fully covering or filling the gap between the wing and wing support 2. The element 17 lies with its edge 18 overlying the leading edge of the wing part 4, while its forward portion 19 bridges over the transitional area or gap between the wing parts 2 and 4. The operation or actuation of the sliding element 17 as illustrated in FIG. 3 is effected by means of a hydraulic cylinder 29.

The actuation of the hydraulic cylinder 20 is controlled by means acting in correlated response to angular movements of the movable wing. As mentioned earlier, the size of the gap varies during angular movement of the wing, therefore, the movement of the filling or plugging element must be capable of variable operation or sliding adjustment to fill the gap in all wing positions between the two extreme positions.

A modification of the embodiment of FIG. 3 is shown in FIG. 4. In place of the hydraulic cylinder 20, a pulley arrangement is employed. A pulley 21 is keyed to the movable wing 4 for rotation therewith. The element 17 which is identical to that of FIG. 3, is spring-biased to the outward position by compression spring 26. A cable 27 is attached to the sliding element 17 and passes around guides 28 and 29. As the pulley rotates through one complete movement cycle of the wing, from the fully extended position to the closed position, the element 17 is allowed to move outwardly by the action of spring 26 and the slackening of cable 27. The element 17 is drawn in by the pulling of cable 27 against the action of the spring 26. The pulley is so positioned that the movements of the wing 4 and the element 17 are properly correlated.

Figure 5:
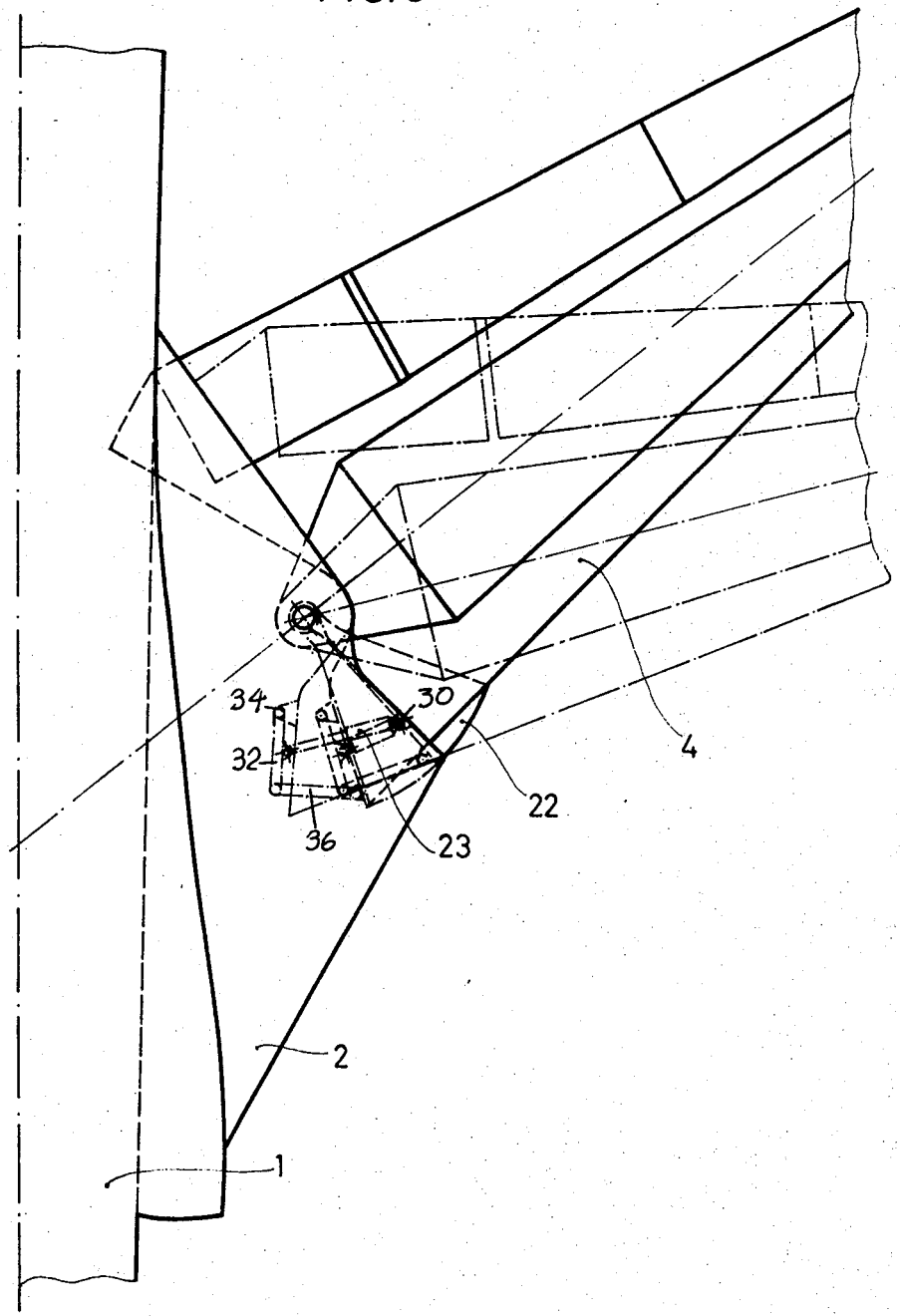
FIG. 5 is a plan view of another embodiment of the aircraft wing structure of this invention.

Another embodiment is illustrated in FIG. 5. An element 22 is rotated so as to move into the gap 7. The element 22 is shaped like a pendant with a rounded bottom edge 22a and is pivoted at the pivot point of the wing. The hydraulic cylinder 23 is pivotally attached to the inner surface of the fixed portion 2 at 30. The piston rod of the cylinder is pivotally attached to the link 32 at its midpoint. The link 32 is pivotally attached at one end 34 to the inner edge of the wing 4. Link 36 is pivotally attached to the line 32 at its other end with the link 36 also being pivotally attached to the line 32 at at is other end with the link 36 also being pivotally attached to the element or pendant 22. In operation, when the wing 4 is in its center position, the cylinder is contracted and the pendant is pivoted to the full line position thereby filling the gap. In the extreme positions of the wing the cylinder is extended and the pendant or segment 22 is drawn inwardly by the link system as shown in phantom in FIG. 5. Of course, the segment 22 assumes a plurality of positions during angular movement of the wing to fill the constantly varying gap.

In a general manner, while there have been disclosed effective and efficient embodiments of the invention, it should be well understood that the invention is not limited to such embodiments as there might be changes made in the arrangement, disposition, and form of the parts without departing from the principle of the present invention.

We claim:

1. In an aircraft having angularly adjustable wings pivotable about a vertical axis wherein gaps of varying size are formed in the wing surface at its pivotal connection during pivotal movement of the wing, first means for adjustably filling said gap thereby presenting a substantially smooth wing surface, said first means comprising an inflatable portion of said pivotal wing in the area of said gap, and second means for adjustably inflating said first means in correlation to the pivotal movements of said wings.

2. The aircraft of claim 1 wherein said inflatable portion is a leading edge portion of said wing having in the inflated position a radius whose fixed point is coincident with said vertical axis.

3. In an aircraft having angularly adjustable wings pivotable about a vertical axis wherein gaps of varying size are formed in the wing surface at its pivotal connection during pivotal movement of the wing, first means for adjustably filling said gap thereby presenting a substantially smooth wing surface, said first means comprising a resilient leading edge portion of said wing and a follower movably mounted within said wing adjacent said resilient portion, and a second means for adjustably actuating said follower to bulge said resilient portion outwardly to fill said gap.

4. The aircraft of claim 3 wherein said follower is normally biased inwardly and said second means is a cam rotating with said wing and drivingly engaging said follower.

5. In an aircraft having angularly adjustable wings pivotable about a vertical axis wherein gaps of varying size are formed in the wing surface at its pivotal connection during pivotal movement of the wing, first means for adjustably filling said gap thereby presenting a substantially smooth surface, said first means comprising a wedge-shaped member slidable along the leading edge of said wing and into and out of said gap, second means for adjustably moving said wedge-shaped member in correlation to the pivotal movements of said wings, said second means comprising a pulley rotatable with said wing and connected to said wedge-shaped member by a cable wound at one end on said pulley, and biasing means normally biasing said wedge-shaped member to the outward, gap-filling position.

6. In an aircraft having angularly adjustable wings pivotable about a vertical axis wherein gaps of varying size are formed in the wing surface at its pivotal connection during pivotal movement of the wing, first means for adjustably filling said gap thereby presenting a substantially smooth surface said first means comprising a pendant-shaped member pivotally mounted within said wing for movement into said gap and having an arcuate bottom surface for variably filling said gap, and second means for adjustably moving said first means in correlation to the pivotal movements of said wings.

7. The aircraft of claim 6 wherein said second means comprises a hydraulic motor and linkage system.

* * * * *